United States Patent
Haas et al.

(10) Patent No.: US 8,580,448 B2
(45) Date of Patent: Nov. 12, 2013

(54) FUEL CELL WITH SELECTIVELY CONDUCTING ANODE COMPONENT

(75) Inventors: Herwig Haas, Vancouver (CA); Francine Berretta, Vancouver (CA); Yvonne Hsieh, Burnaby (CA); Guy Pepin, North Vancouver (CA); Joy Roberts, Coquitlam (CA); Amy Shun-Wen Yang, Port Coquitlam (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 244 days.

(21) Appl. No.: 13/165,049

(22) Filed: Jun. 21, 2011

(65) Prior Publication Data

US 2012/0328967 A1    Dec. 27, 2012

(51) Int. Cl.
    *H01M 8/04*    (2006.01)
(52) U.S. Cl.
    USPC ............................... 429/429; 429/528
(58) Field of Classification Search
    USPC .................................... 429/429, 528
    See application file for complete search history.

(56) References Cited

U.S. PATENT DOCUMENTS

| | | | |
|---|---|---|---|
| 5,013,617 A | 5/1991 | Scheffler | |
| 5,045,414 A | 9/1991 | Bushnell et al. | |
| 6,858,336 B2 | 2/2005 | Reiser et al. | |
| 6,887,599 B2 | 5/2005 | Reiser et al. | |
| 6,887,606 B2 * | 5/2005 | Parr et al. | 429/429 |
| 6,939,633 B2 * | 9/2005 | Goebel | 429/429 X |
| 8,252,486 B2 * | 8/2012 | Kikuchi et al. | 429/528 |
| 8,349,521 B2 * | 1/2013 | Tamura et al. | 429/528 |
| 2006/0134501 A1 | 6/2006 | Lee et al. | |
| 2013/0017471 A1 * | 1/2013 | Haas et al. | 429/492 |

* cited by examiner

*Primary Examiner* — Stephen J. Kalafut
(74) *Attorney, Agent, or Firm* — Patent Central LLC; Stephan A. Pendorf

(57) ABSTRACT

By incorporating a selectively conducting component in electrical series with the anode components in a solid polymer fuel cell, degradation during startup and shutdown can be reduced. As a result, the startup and shutdown procedures can be simplified and consequently certain system apparatus may be omitted. The anode does not need to be rapidly purged with hydrogen on startup or with air on shutdown. Additionally, the auxiliary load usually employed during such purging is not required.

20 Claims, 6 Drawing Sheets

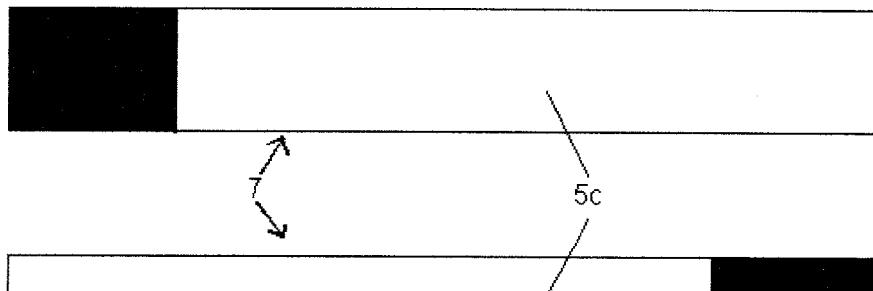
FIG. 2a
FIG. 2b
FIG. 2c
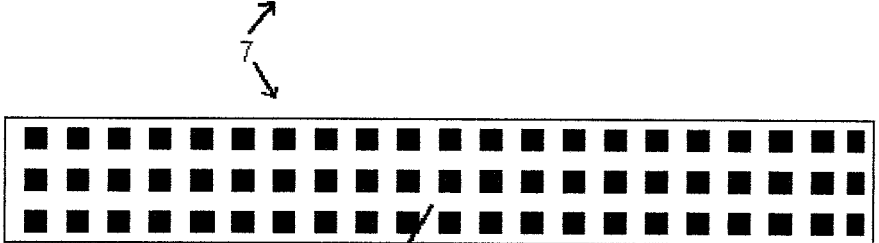
FIG. 2d
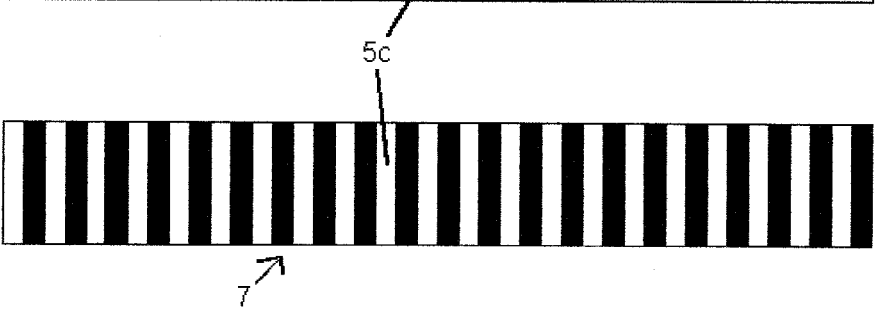
FIG. 2e

FUEL CELL WITH SELECTIVELY CONDUCTING ANODE COMPONENT

FIELD OF THE INVENTION

The present invention pertains to fuel cells, particularly to solid polymer electrolyte fuel cells, and the components used in making such cells.

BACKGROUND OF THE INVENTION

During the start-up and shut-down of fuel cell systems, corrosion enhancing events can occur. In particular, air can be present at the anode at such times (either deliberately or as a result of leakage) and the transition between air and fuel in the anode is known to cause temporary high potentials at the cathode, thereby resulting in carbon corrosion and platinum catalyst dissolution. Such temporary high cathode potentials can lead to significant performance degradation over time. It has been observed that the lower the catalyst loading, the faster the performance degradation. The industry needs to either find more stable and robust catalyst and cathode materials or find other means to address the performance degradation.

A number of approaches for solving the degradation problem arising during start-up and shutdown, which is a key obstacle in the commercialization of Polymer Electrolyte Membranes (PEM) with lower catalyst loadings, have been suggested. The problem has been addressed so far by higher catalyst loadings, valves around the stack to prevent air ingress into the anode while stored, and carefully engineered shutdown strategies. Some systems incorporate an inert nitrogen purge and nitrogen/oxygen purges to avoid damaging gas combinations being present during these transitions. See for example U.S. Pat. No. 5,013,617 and U.S. Pat. No. 5,045,414. Some other concepts involve case startup strategies with fast flows to minimize potential spikes.

For example, U.S. Pat. No. 6,858,336 and U.S. Pat. No. 6,887,599 disclose disconnecting a fuel cell system from its primary load and rapidly purging the anode with air on shutdown and with hydrogen gas on startup respectively in order to reduce the degradation that can otherwise occur. While this can eliminate the need to purge with an inert gas, the methods disclosed still involve additional steps in shutdown and startup that could potentially cause complications. Shutdown and startup can thus require additional time and extra hardware is needed in order to conduct these procedures.

Still, a more efficient, simple and cost effective method needs to be developed for the industry to overcome the degradation problem.

In the prior art, various coatings for cell components or additional layers in the cell assembly have been suggested in order to address other problems. For instance, US20060134501 discloses the use of an electro-conductive coating layer to cover the surface of a metal substrate on which reactant flow pathways are formed. This layer may include a metal oxide and preferably has excellent electrical conductivity characteristics. The coated separator however is considered not to perform and is unsuitable if the electrical conductivity is too low.

Recently, in PCT patent application serial number PCT/EP2010/007857, titled "Fuel Cell With Selectively Conducting Anode Component", filed Dec. 22, 2010 by the same applicant, which is hereby incorporated by reference in its entirety, it is disclosed that the degradation of a solid polymer fuel cell during startup and shutdown can be reduced by incorporating a suitable selectively conducting component in electrical series with the anode components in the fuel cell. The component is characterized by a low electrical resistance in the presence of hydrogen or fuel and a high resistance in the presence of air (e.g. more than 100 times lower in the presence of hydrogen than in the presence of air).

SUMMARY OF THE INVENTION

The present invention provides for more efficient, simple, and cost effective startup and shutdown of fuel cell systems while avoiding the degradation that can otherwise occur. The methods and apparatus are applicable to fuel cell systems comprising a series stack of solid polymer electrolyte fuel cells and a programmable controller for controlling either a startup sequence of the system, or a shutdown sequence, or both. The fuel cells comprise a solid polymer electrolyte, a cathode, and an anode, in which the anode comprises anode components connected in series electrically. Specifically though, in accordance with the aforementioned PCT patent application serial number PCT/EP2010/007857, the anode components comprise a selectively conducting component comprising a selectively conducting material wherein the electrical resistance of the selectively conducting component in the presence of hydrogen is more than 100 times lower (preferably more than 1000 times lower) than the electrical resistance in the presence of air.

By incorporating such a selectively conducting component in the fuel cell anodes, certain purging steps which are conventionally considered necessary may be omitted instead during startup and/or shutdown. Further still, the conventional requirement to supply power to an auxiliary load in order to properly control the power drawn from the fuel cell stack during such operations may also be omitted.

Specifically, the startup method comprises controlling the fuel cell system according to the startup sequence, and not purging the anode with hydrogen during the startup sequence. In addition, the startup method can comprise not supplying power from the fuel cell stack to an auxiliary load during the startup sequence.

The shutdown method comprises controlling the fuel cell system according to the shutdown sequence, and not purging the anode with air during the shutdown sequence. The shutdown method can also comprise not supplying power from the fuel cell stack to an auxiliary load during the shutdown sequence. And further still, the shutdown method can comprise not purging the cathode with air during the shut-down sequence.

Because the selectively conducting component in the cell anodes behaves as an "intelligent switch", increasing or decreasing the internal cell impedance according to the gas species present, large cell reversal voltages do not occur on startup or shutdown and the associated degradation does not occur. Furthermore, such an "intelligent switch" can prevent significant power from being drawn from the fuel cell stack in the absence of fuel, even if the primary load is applied, and this can obviate the need for an auxiliary load in these situations.

To employ such methods, the controller is configured to control the fuel cell system according to the startup sequence, and not to purge the anode with hydrogen during the startup sequence, and/or to control the fuel cell stack according to the shut-down sequence, and not to purge the anode with air during the shutdown sequence. By employing such methods, an associated fuel cell system may not require an auxiliary load nor apparatus for providing for an anode air purge.

The invention is particularly suitable for use in fuel cell systems which will be subjected to numerous startup and shutdown sequences over the lifetime of the system (e.g. over 1000) because the accumulated effects of degradation will be much more substantial. For instance, the invention is particularly suitable for automotive applications in which the fuel cell system is the traction power supply for a vehicle and the primary load is the drive system for the vehicle.

BRIEF DESCRIPTION OF THE FIGURES OF THE DRAWINGS

FIGS. 2a-e show a series of schematic views for exemplary anode gas diffusion layers coated with a selectively conducting layer but having uncoated regions for performance, cell reversal, or other purposes.

DETAILED DESCRIPTION OF THE PREFERRED EMBODIMENTS

Definitions

Figure 1:
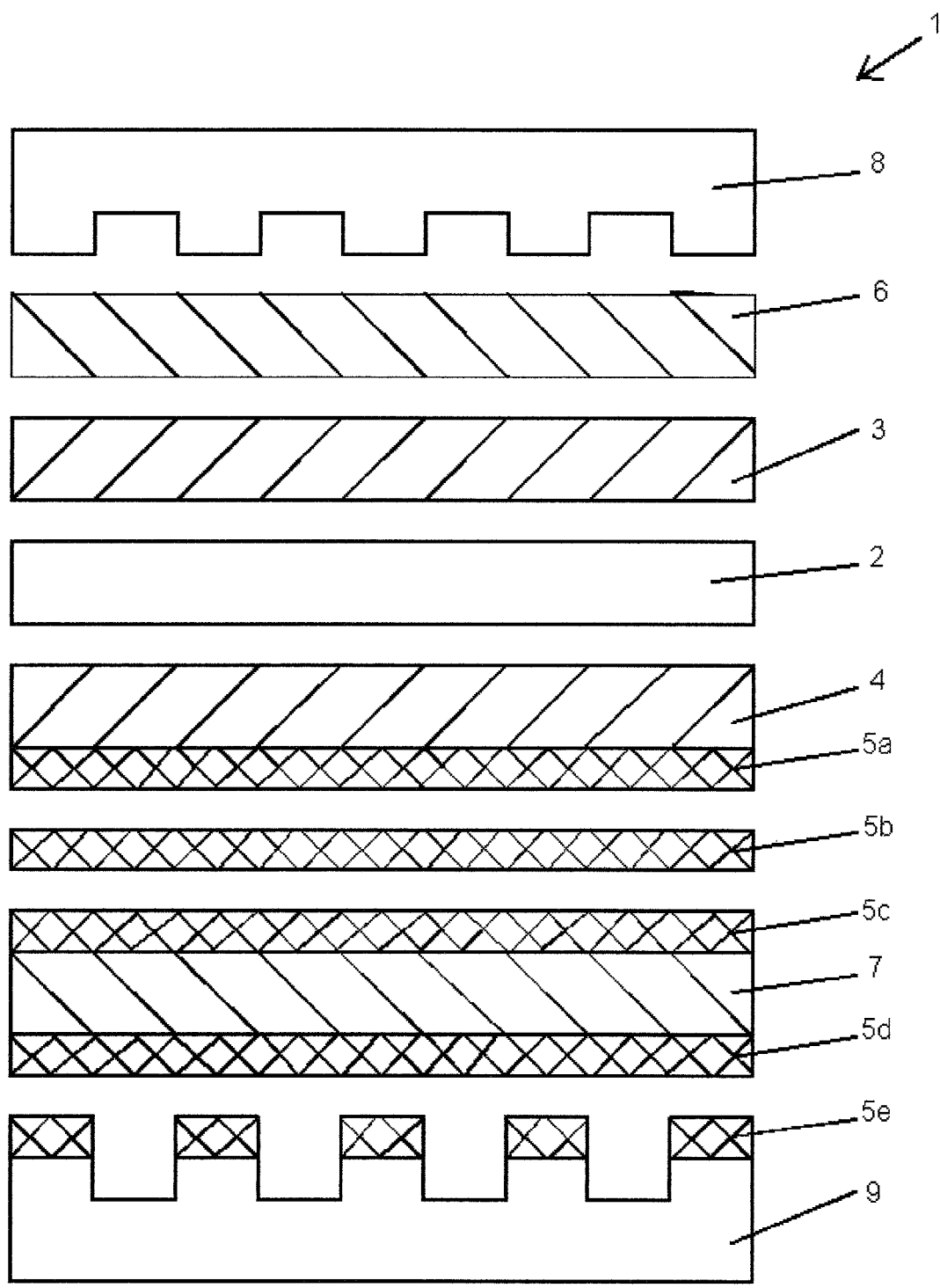
FIG. 1 shows a schematic exploded view of the various components making up a unit cell for a solid polymer electrolyte fuel cell.

Herein, "purging" refers to the operation of flowing gas through the flow field/s of a given electrode/s in order to remove fluids from the flow field/s. During purging, gas enters at a reactant inlet and exhausts at a reactant outlet for the electrode while the primary load is not applied across the stack. (Thus, for instance, the rapid supply of a reactant gas, while maximum power is being drawn by the primary load, is not purging.) During purging generally, an auxiliary load provided within the fuel cell system may or may not be applied across the fuel cell stack, and the other electrode/s may or may not be provided with gas (e.g. may or may not be being purged as well).

An "auxiliary load" herein refers to an electrical load specifically provided as part of the fuel cell system and is not the primary load.

A solid polymer electrolyte fuel cell stack for generating electricity at useful voltages generally includes several to many unit cells stacked in multi-layers. Each unit cell is formed with a membrane-electrode assembly (MEA) comprising an anode, sometimes referred to as a fuel electrode or an oxidation electrode, and a cathode, sometimes referred to as an air electrode or a reduction electrode, connected by means of a solid polymer electrolyte membrane between them. Both the anode and the cathode comprise appropriate catalysts (e.g. Pt) to promote the electrochemical reactions taking place therein. Porous, electrically conductive, gas diffusion layers (GDLs) are often employed adjacent the electrodes for purposes of distributing reactants to and by-products from the electrodes. And electrically conductive flow field plates comprising a plurality of channels patterned therein are often employed to evenly distribute reactants to, and by-products from, the adjacent GDLs. The flow field plates can serve as a separator between fuel cells in series and are thus sometimes referred to as a bipolar plate.

Hydrogen fuel is supplied to the anode and adsorbed on the anode catalyst, often present in the form of a catalyst coating on the membrane electrolyte (the assembly being known as CCM) on the anode. The fuel is oxidized to produce protons and electrons. The electrons are transferred to the cathode via an external circuit, and the protons are transferred to the cathode through the polymer electrolyte membrane. An oxidant, typically air, is supplied to the cathode, and the oxidant, protons and electrons are reacted on the catalyst present on or in the cathode to product electricity and water.

It has been found that the presence of a selectively conducting anode component according to the present invention integrated into the unit cell in series electrically with the other anode components can allow one to avoid severe degradation problems that can arise from repeated startup and shutdown of the fuel cell. The transient high cathode potentials which can occur at these times can be avoided via the presence of the selectively conducting component. The selectively conducting component may be an appropriately located selectively conducting layer comprised of a metal oxide that exhibits a low resistance when the gas environment around the layer is hydrogen or fuel, and a high resistance when air is the gas environment. The layer can be applied to the GDL or CCM, or in between. The layer should be porous when applied to the GDL or CCM. If applied to a flow field or bipolar plate, it need not be porous. The layer can also be dispersed throughout the GDL.

Materials Selection

The materials useful as the selectively conducting material and which exhibit the foregoing properties are primarily metal oxides such as tin oxide which are known to exhibit such properties in certain gas sensor applications. In the presence of hydrogen, such materials become more electrically conductive with a conduction path being created by an oxygen deficient structure at the surface. In the presence of oxygen, the materials convert to a stoichiometric state and become non-conductive.

Useful materials may include tin oxide ($SnO_{2-x}$), silica dispersed tin oxide (Silica-$SnO_{2-x}$), indium oxide/tin oxide (ITO), hydrated tin oxide, zirconium oxide ($ZrO_{2-x}$), cerium oxide ($CeO_{2-x}$), titanium oxide ($TiO_x$), molybdenum oxide ($MoO_x$), indium oxide ($In_2O_x$), niobium oxide ($NbO_2$) or combinations thereof, where x is a valence appropriate for the particular metal employed. Both stoichiometric and non-stoichiometric ratios are applicable. To date, tin oxide, silica dispersed tin oxide, or indium oxide/tin oxide have been found to be most preferable. But other metal oxides exhibiting some suitable level of conductivity may also be contemplated, including both n and p type oxides, such as but not limited to, $WO_x$, $NiO_x$, $Cr_2O_x$, ZnO, $Ga_2O_x$, $BaSnO_x$, $CuO_x$, $Al_2O_x$, $Bi_2O_x$, $Fe_2O_x$, $CdO_x$, $SrGe_x$, $Co_yO_x$, $Ag_2O_x$, CrTiO, $V_2O_x$, $Ta_2O_x$, $La_2O_x$, $BaO_x$, $Sb_2O_x$, $PdO_x$, $CaO_x$, $Cr_2O_x$, $Mn_2O_x$, $SrO_x$, and $Nd_2O_3$ where x is a valence appropriate for the particular metal of interest. Further still, useful materials can also include ternary, quaternary and complex metal oxides such as perovskites, niobates, tantalates, stannates and manganates. Mixtures of the oxide can also be used. Any appropriate combination can be used. Layers of the oxides or different oxides in different layers and/or multiple layers can also be used.

The metal oxides used can be pure oxides or have an amount of noble metal associated therewith. The presence of a suitable noble metal can be used to control the base resistance to an extent but also can be expected (via dissociation of adsorbed species) to enhance sensitivity, response times, stability or hydrogen selectivity, and decrease interference from other gases present, such as water vapour or CO, and thereby change operating characteristics including magnitude of resistance change, "switching time", and maximum response operating temperature.

In particular, enhancing sensitivity can be desirable because it can be difficult to achieve significant reactivity for a selected metal oxide under the conditions typically experienced in a solid polymer electrolyte fuel cell (i.e. at relatively low temperatures under 100° C. and high humidity conditions). In general, the reactivity of metal oxides is significantly improved at higher temperatures around 200-750° C. and high humidity conditions can tend to passivate gas sensing ability.

Noble metals may be incorporated with a suitable metal oxide by way of deposition thereon or alternatively by doping the metal oxide with the noble metal. Further still, noble metal may be provided instead by way of a separate layer intimately contacting the metal oxide. Suitable noble metals include platinum (Pt), palladium (Pd) and platinum/antimony (PtSb). The amount incorporated can be varied to achieve maximum functionality but would not be expected to exceed 30 weight-% and preferably is less than 5 weight-%.

Other materials may also be incorporated with the metal oxide for similar or other purposes. Such materials may include PdO, Au, Ru, Rh, Ag, as well as Sn, In, Cu, Ir, Si, Si compounds, Sb, V, Mo, Al, Ta, Nb, Ge, Cr, Bi, Ga, Li, Ce, La, Y, Fe and Co. Silica for instance may be incorporated to improve selectivity (by helping the surface stay dry) for the fuel of interest. In the Examples below, a silica containing sample was used in part because it was present in a commercially available $SnO_2$ sample having a desired particle size.

Consideration should be given to the possibility that certain species may leach out into the MEA and act as contaminants that degrade MEA performance. Species such as iron, copper, chromium, zinc, vanadium, titanium and chloride could for instance possibly act as contaminants.

Exemplary Fuel Cell and Selectively Conducting Layer Constructions

FIG. 1 shows an exploded schematic view of the various components making up a unit cell for a typical solid polymer electrolyte fuel cell and also some of the various locations that a selectively conducting layer of the invention might be incorporated.

Unit cell 1 comprises a solid polymer electrolyte 2, cathode 3, and anode 4. Adjacent the two cathode and anode electrodes are cathode GDL 6 and anode GDL 7 respectively. Adjacent these two GDLs are cathode flow field plate 8 and anode flow field plate 9.

In accordance with the invention, a selectively conducting component is incorporated in electrical series with the anode components. As shown in FIG. 1, this selectively conducting component can be incorporated in one of the existing anode components or alternatively as a separate discrete layer. For instance, the selectively conducting component can be layer 5a which forms part of anode 4. Or, the selectively conducting component can be layer 5c or 5d which form part of anode GDL 7. Layer 5c is located on the side of anode GDL 7 which is adjacent anode 4. Layer 5d is located on the side of anode GDL 7 which is opposite anode 4 and adjacent anode flow field plate 9. Further, the selectively conducting component can be layer 5e which forms part of flow field plate 9 and is on the side adjacent anode GDL 7. While these various selectively conducting layers are shown as being on only one side of the components they are associated with in FIG. 1, the layers need not be on one side only. While perhaps not preferred, the layers may actually extend throughout the associated components. Further still, the selectively conducting layer can be a discrete layer 5b shown in FIG. 1 as being between anode 4 and anode GDL 7. Alternatively however, discrete layer 5b may instead be located between anode GDL 7 and anode flow field plate 9 (not shown in FIG. 1).

Layers like those illustrated in FIG. 1 may be prepared in a variety of ways. A preferred method starts with a solid-liquid dispersion of suitable ingredients and, using a suitable coating technique, applying a coating of the dispersion to a selected anode component. After application, the coated component is dried and optionally subjected to other post-treatment (e.g. sintering). Alternatively, coating techniques can be used to prepare discrete layers.

A dispersion for applying coatings in this manner will typically comprise an amount of selectively conducting metal oxide particles, one or more liquids in which the metal oxide particles are dispersed, and optionally other ingredients such as binders (e.g. ionomer, PTFE) and/or materials for engineering porosity or other desired characteristics in the selectively conducting component. Water is a preferred dispersing liquid but alcohols and other liquids may be used to adjust viscosity, to dissolve binders, and so forth.

Conventional coating techniques, such as Mayer rod coating, knife coating, decal transfer, or other methods known to those skilled in the art, may be employed to apply dispersion onto or into a selected anode component. Alternatively, a coating may be applied to a release film, dried, and then applied under elevated temperature and pressure so as to bond to a selected anode component.

Discrete layers such as layer 5b may be prepared in a like manner by applying a coating onto or into a suitable substrate (e.g. soaking a glass fibre matrix, an expanded PTFE matrix, quartz filled filter nylon matting, or other substrate in dispersion, followed by drying and sintering). Alternatively discrete layers having similar compositions may be prepared completely from a suitable dispersion (e.g. in which the dispersion contains glass or other fibres). Use of a discrete selectively conducting oxide layer can permit several design options.

As mentioned above, although not shown In FIG. 1, the selectively conducting layer can extend through the anode component it is associated with. In the case of anode 4, anode catalyst may in principle essentially be supported on a suitable selectively conducting metal oxide layer. However, it may be advantageous to keep selectively conductive layer 5a separate from the anode catalyst. Because ionomer electrolyte is provided in the vicinity of the anode catalyst, dissolution and electrochemical stresses may be reduced by not allowing direct contact between the anode catalyst and the selectively conducting layer. A carbon sublayer may for instance be incorporated between the two for this purpose.

The properties of the selectively conducting layer, regardless of where and in what form it appears, need to be tailored to certain specific system needs. In particular, the layer has to be engineered so as to exhibit the different desired resistance characteristics such that it has acceptable conductance in the presence of hydrogen and yet is sufficiently resistive in the presence of oxygen (air). As is known in the prior art, layers or coating of metal oxides can be made that are always conductive or alternatively may not be conductive enough. Because the change in resistance with surrounding atmosphere is associated with changes at the surface of the metal oxide particles as opposed to the bulk, the choice of metal oxide material, its particle size and shape, the thickness and porosity of the fabricated layer, along with other variables are all important considerations. Layer thicknesses may for instance be expected in the range from about 1 μm to 300 μm. And particle sizes may be in the range of 10 to 25 nm with surface areas of 40 $m^2/g$ to 200 $m^2/g$. Those skilled in the art will appreciate the variables involved and the interactions between them and are therefore expected to be able to design layers appropriately. The layer must have sufficient resistance to prevent local high voltages and reduce corrosion currents in practice during the startup and shutdown transitions. For certain commercial applications, modelling suggests for instance that good resistance targets may involve a three order of magnitude change in resistance, such as over $10^{-3}$ ohms/$m^2$ in air and less than $10^{-6}$ ohms/$m^2$ in hydrogen. Such targets have been demonstrated to be viable in the Examples to follow. Of course, other factors also must be considered by those skilled in the art. For instance, if the layer is embodied in the anode or anode GDL, it must be sufficiently porous to permit acceptable diffusion of the gases. The morphology of the layer, i.e. grain size, porosity, binders etc. will determine gas transfer properties then as well as resistance related characteristics. On the other hand, a layer (e.g. 5e) on the anode flow field plate may however be a solid coating.

While the preceding discussion is directed to use of a single selectively conducting layer, there may be advantages associated with using multiple layers of applied metal oxide (e.g. one coating may be of a less expensive material and another more expensive one but at a lower loading). An optional "filter" layer may be employed in addition in order to limit the amount of air reaching the selectively conducting metal oxide. This functionality may be combined for instance in the anode GDL.

Incorporating a selectively conducting component at the anode can be advantageous in fuel cells with regards to degradation arising during startup/shutdown. However, the presence of such a component or layer can potentially lead to a loss in cell performance (due to an increase in internal resistance) and also may lower the tolerance of the fuel cell to voltage reversals. While a selectively conductive layer may therefore appear as a continuous layer over the entire active surface of the anode, it may be desirable to pattern the layer in order to mitigate these possible adverse effects. Providing some regions where the layer of selectively conductive material is absent may allow for dissipation of reversal currents and/or provide a sacrificial area in the event of cell reversal. FIGS. 2a-2e show various options available in this regard. FIG. 2a shows anode GDL 7 with coated layer of selectively conductive material 5c in which the coated layer is absent in the vicinity of the anode inlet (i.e. the left hand side of GDL 7 in FIG. 2a, wherein the coating is absent over about or more than 10% of the active surface of the anode). FIG. 2b shows an embodiment where the coated layer is absent in the vicinity of the anode outlet (i.e. the right hand side of GDL 7 in FIG. 2b, wherein the coating is absent over about or more than 10% of the active surface of the anode). FIG. 2c shows an embodiment comprising a stripe of selectively conducting layer 5c down the middle of GDL 7 with coating absent at the edges. FIG. 5d shows an embodiment wherein the uncoated regions of layer 5c appear as a pattern of uncoated squares. FIG. 2e shows an embodiment comprising a plurality of discrete selectively conductive stripes 5c extending across the active surface of the anode. Yet another option, not shown in FIGS. 2a-2e is the possibility of incorporating a selectively conducting layer in a graded structure. That is, the thickness of the layer and hence the resistance properties may be varied over the length of the active anode surface.

Further still, in a fuel cell stack comprising a plurality of stacked fuel cells (a typical commercial embodiment), the layer of selectively conductive material may be entirely absent in certain cells altogether (e.g. every other cell in the stack, every third cell, etc.). Since corrosion loop currents usually go through all the cells in a stack, blocking the current locally may impact neighbouring cells as well.

The use of the selective conducting material avoids severe degradation by avoiding high cathode potentials. Without being bound by theory, it is believed this is accomplished as follows. During startup and shutdown, air may be present at the anode as a result of leakage after prolonged storage or as part of a deliberate shutdown procedure. When a hydrogen wave enters a cell upon start-up, the cell voltage can rise from near 0 V to above 0.7 V and beyond. This voltage will be "forced" on the region of the cell outlet (air-air region) while the inlet area sees hydrogen at the anode and air at the cathode. Under these conditions, a substantial current (up to 0.1 $A/cm^2$) can flow through the membrane electrode assembly (MEA) in the air-air region, forcing the cathode potential up and the anode potential down. However, if a high enough resistance is present in the air-air region (due to the presence of the selectively conducting layer), then the current in the air-air region will be substantially reduced and the high cathode potentials prevented. But such a high resistance is not desired during regular operation. The trigger to switch between the conducting mechanisms is the metal oxide gas sensitive selective layer of the present invention. The switching mechanism is fast (<10 sec and preferably <5 sec), easily reversible and is able to withstand thousands of cycles.

Use of the selective conducting material in a fuel cell allows the advantages of system simplification and cost reduction. Less additional system components are needed, i.e., isolation valves, shorting devices, etc. Catalyst loading reduction is simplified as durability stressors are turned off. Gas need not be wasted at startup from unnecessary purging, and specialty gases are not required.

The selective conducting components in the cell anodes act as an "intelligent switch" for the fuel cell stack, i.e. increasing or decreasing the internal impedance if the stack depending on what the gas composition is at the anodes. With a sufficient increase in stack impedance, the reduction of oxygen on the anode side is adequately prevented in the presence of an applied load across the stack, and thus damage to the cells is prevented. The system does not require a switchover from the primary load to a specially selected auxiliary load in order to reduce the cell voltages during purging because the increased impedance adequately limits the power capability of the stack.

The conventional procedures involving hydrogen purging at the anode on startup and air purging at the anode and at the cathode on shutdown are not required in this situation. As a result, startup and shutdown can be faster and less complicated and certain apparatus may be omitted from the fuel cell system.

Figure 6:
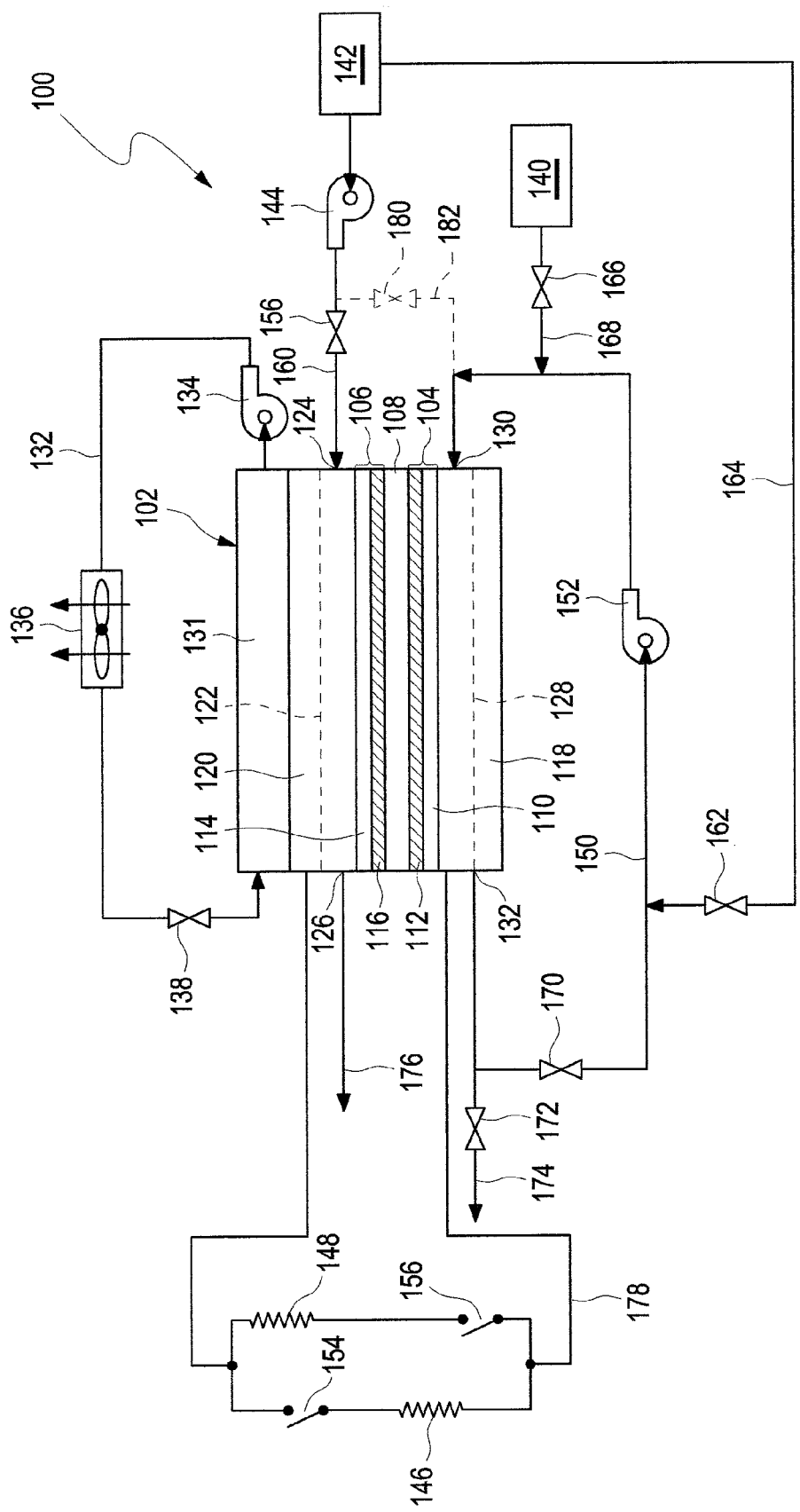
FIG. 6 shows a schematic of a prior art fuel cell system (excerpted from U.S. Pat. No. 6,858,336) comprising apparatus for providing an anode air purge during startup and for applying an auxiliary load on both startup and shutdown.

FIG. 6 has been excerpted from the aforementioned U.S. Pat. No. 6,858,336, and shows what is now a conventional fuel cell system comprising apparatus for providing an anode air purge on startup and for applying an auxiliary load to the stack during both startup and shutdown. A part or all of this apparatus may be omitted in the system of the invention.

Specifically, fuel cell system 100 comprises solid polymer fuel cell 102 comprising anode 104, cathode 106, and electrolyte layer 108. Hydrogen fuel is provided by hydrogen source 140 and air oxidant is provided by air source 142. A recirculation loop is provided at the anode of cell (and includes elements 170, 150, 152). A circulating liquid coolant subsystem is also provided to the cell (and includes elements 131, 134, 132, 136, 138). FIG. 6 shows primary load 146 which can be connected or disconnected across the stack by switch 154.

FIG. 6 also shows apparatus for providing an air purge to anode 104. One option is to provide air to the recycle loop via valve 162 and conduit 164. Another option shown in phantom is to provide air to the anode inlet via valve 180 and conduit 182. In the present invention, such apparatus may be omitted.

Further, FIG. 6 shows apparatus for applying an auxiliary load across cell 102 when primary load 146 is disconnected. This apparatus includes auxiliary load 148 and switch 156. In the present invention, such apparatus may also be omitted.

As mentioned above, FIG. 6 has been excerpted from U.S. Pat. No. 6,858,336. However, not all elements referenced in FIG. 6 (FIG. 1 of U.S. Pat. No. 6,858,336) need be discussed herein for an understanding of the present invention. For the sake of brevity, the following elements having reference numbers are not discussed in detail herein: anode substrate 110 with anode catalyst layer 112 disposed thereon, cathode substrate 114 with cathode catalyst layer 116 disposed thereon, anode flow field plate 118, cathode flow field plate 120, channels 122, inlet 124 and outlet 126 of a cathode flow field for carrying an oxidant across the cathode, channels 128 forming an anode flow field for carrying a hydrogen containing fuel across the anode from an inlet 130 to an outlet 132, air blower 144, auxiliary load switch 156, conduit 160, valve 166 in a fuel feed conduit, conduit 168, anode exhaust vent valve 172 in anode exhaust conduit 174, conduit 176, and external circuit 178

In principle, fabrication of the selectively conducting component may be relatively simple and low cost and could be combined for instance with metal plate passivation steps. By decreasing the carbon corrosion and cathode catalyst degradation due to startup/shutdown degradation, lower catalyst loadings can be considered in MEA design. Another potential advantage offered is the ability to use less electrochemically stable materials such as PtCo, which are more sensitive to the fuel cell voltage cycling window.

Use of the invention is not limited just to fuel cells operating on pure hydrogen fuel but also to fuel cells operating on any hydrogen containing fuel or fuels containing hydrogen and different contaminants, such as reformate which contains CO and methanol.

The following Examples have been included to illustrate certain aspects of the invention but should not be construed as limiting in any way.

EXAMPLES

Selectively Conducting GDL Component Preparation and Characterization

Several different metal oxide compositions were obtained in order to prepare solid-liquid dispersions for use in coating selectively conducting layers onto test GDL samples.

The metal oxide compositions obtained were:
$SnO_2$ obtained from SkySpring Nanomaterials Inc. and characterized by particle sizes between 50 and 70 nm and a surface area between 10 and 30 $m^2/g$ 1 weight-% Pt—$SnO_2$ which is a proprietary composition obtained from a commercial supplier and having the Pt deposited on the $SnO_2$ 5 weight-% Pt—$SnO_2$ which is a proprietary composition obtained from a commercial supplier and having the Pt deposited on the $SnO_2$ Silica dispersed $SnO_2$ obtained from Keeling and Walker and characterized by particle sizes less than 5 micrometers and a surface area greater than 100 $m^2/g$ ITO (indium tin oxide) obtained from several sources including SkySpring Nanomaterials Inc. and characterized by particle sizes generally between 20 and 70 nm and surface areas between 15 and 40 $m^2/g$ hydrated $SnO_2$ (metastannic acid) obtained from Keeling and Walker and characterized by a surface area about 180 $m^2/g$.

Solid-liquid ink dispersions were prepared using each of these various metal oxide compositions. The dispersions comprised mixtures of the selected metal oxide, METHO-CEL™ methylcellulose polymer, distilled water, isopropyl alcohol, and optionally PTFE (polytetrafluoroethylene) suspension. The dispersions were all prepared first by manually mixing the components together, followed by sonication, and finally shear mixing with a Silverson mixer. The dispersions were then used to coat a conventional carbon fibre anode GDL from Toray using a Mayer rod with one or more passes of coating. In between passes, the coatings were allowed to air dry at ambient temperature and after all the passes were applied, the GDL samples were sintered at about 400° C. for ten minutes. The average thickness of the total coating applied was in the range from about 5-15 micrometers.

For initial screening purposes, small experimental fuel cells were made and initial polarization plots (cell voltage versus current density plots) were obtained using each coated GDL. These experimental fuel cells employed a conventional polymer electrolyte membrane coated with catalyst on both sides. To determine whether the coated GDL adversely affected fuel cell performance, experimental cells were assembled using the coated GDLs as an anode GDL and a conventional GDL as a cathode GDL. The coated anode GDL was then exposed to hydrogen and should thus desirably have a relatively low resistance. To determine whether the coated GDL might adequately protect against high transient cathode voltages, other experimental cells were assembled using the coated GDLs as a cathode GDL and a conventional GDL as an anode GDL. In these cases, the coated GDLs were exposed to air and should thus desirably have a relatively high resistance. (In the preceding experimental fuel cell constructions, the selectively conducting coated side of the GDL was located adjacent the appropriate electrode in the catalyst coated membrane assembly.)

In this testing, the experimental test cells using the GDLs coated with $SnO_2$, 1 weight-% Pt—$SnO_2$, and 5 weight-% Pt—$SnO_2$ exhibited the most promising voltage versus current density characteristics. All typically provided more than 0.7 V output at current densities up to 1.2 $A/cm^2$ when the selectively conducting GDLs were used at the anode and thus were exposed to hydrogen, while none could sustain 0.7 V output above 0.2 $A/cm^2$ when the GDLs were used at the cathode and thus were exposed to air. These coated GDLs therefore appeared most attractive for use as selectively conducting components. However, the other metal oxides and GDLs coated therewith exhibited similar results qualitatively and thus might still be expected to be suitable, especially with modifications to the particle size, dispersion mixture, and/or coating amount or other characteristics.

Further experiments were performed to determine effectiveness in preventing degradation in fuel cells subjected to startup/shutdown cycling. The following coated and comparative anode GDL samples were used:

TABLE 1

| Anode GDL | Metal oxide composition used | # of coating passes | PTFE binder present? |
|---|---|---|---|
| $SnO_2 \times 1$ | $SnO_2$ | 1 | Yes |
| $SnO_2 \times 2$ | $SnO_2$ | 2 | Yes |
| 1% Pt—$SnO_2 \times 2$ | 1% Pt—$SnO_2$ | 2 | No |
| 1% Pt—$SnO_2 \times 4$ | 1% Pt—$SnO_2$ | 4 | Yes |
| 5% Pt—$SnO_2 \times 2$ | 5% Pt—$SnO_2$ | 2 | No |
| Silica-$SnO_2$ | Silica-$SnO_2$ | 8 | Yes |
| Comparative | None | 0 | NA |

(% means weight-%)

To get information on the actual resistance characteristics expected of the selectively conducting layer on these GDLs, resistance measurements were obtained on several related samples in a closed, environmentally controlled chamber. Coatings prepared in a like manner to some of the sample GDLs above were applied to Kapton polymer film. The in-plane resistances of the coated layers were determined by applying probes to the coating surface. The samples were 2.7 cm by 1.9 cm in size and the resistance was measured over the 1.9 cm dimension. The samples were then alternately exposed to hydrogen and air in the chamber while the in-plane resistance was recorded.

Figure 3:
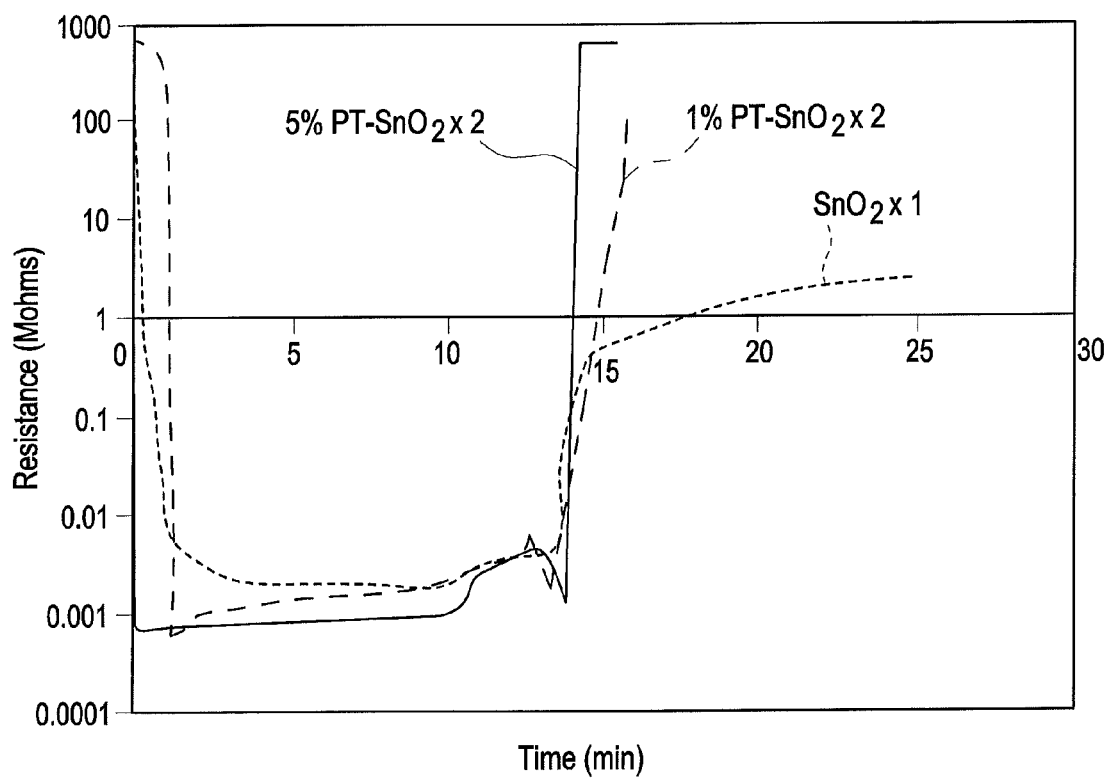
FIG. 3 shows plots of resistance versus time for several discretely prepared selectively conducting layers of the Examples while alternately exposing them to hydrogen and air.

FIG. 3 shows plots of resistance versus time for three coatings similar to GDL samples $SnO_2 \times 1$, 1 weight-% Pt—$SnO_2 \times 2$, and 5 weight-% Pt—$SnO_2 \times 2$ above. In FIG. 3, the first recorded points were taken with the coatings exposed to air as prepared. Immediately thereafter, the coatings were exposed to hydrogen and about 15 minutes later exposed back to air again. In all cases, the change in resistance was dramatic and relatively rapid. The Pt deposited tin oxide coatings changed resistance particularly rapidly and were characterized by up to a five orders of magnitude change in resistance (from over 100 ohm to almost 1 milliohm).

Preparation and Startup/Shutdown Testing of Fuel Cells Comprising Selectively Conducting Anode GDLs A series of commercial size experimental fuel cells were made using the anode GDLs of Table 1. The same type of catalyst coated membrane electrolytes and conventional cathode GDLs were used as were used in the preceding test cells. Assemblies were stacked such that the selectively conducting layer of the anode GDLs were adjacent the anode catalyst coating on the membrane electrolyte. The assemblies were then bonded together under elevated temperature and pressure and placed between appropriate cathode and anode flow field plates to complete the fuel cell.

The cells were operated at a current density of 1.5 A/cm² using hydrogen and air reactants at 60° C. and 70% RH and were periodically subjected to startup/shutdown cycles designed to accelerate degradation. The cycling comprised removing the electrical load while maintaining the flow of reactants for 10 seconds, applying a load for 5 seconds to draw 0.7 A/cm², ramping the load over 30 seconds to draw 1.5 A/cm², removing the load for 5 seconds while maintaining the flow of reactants, purging the anode with air for 15 seconds, and repeating.

Voltage output of each cell was recorded after each startup/shutdown cycle. In addition, polarization characteristics (voltage as a function of current density) characteristics were obtained for the cells throughout the startup/shutdown cycle testing. It was observed that the fuel cell employing the silica dispersed $SnO_2$ based anode GDL produced a somewhat unstable voltage when operating at higher relative humidity and so is not reported on further. (This design would need modification for stable operation.) The other cells did not exhibit any voltage instability during testing.

Figure 4:
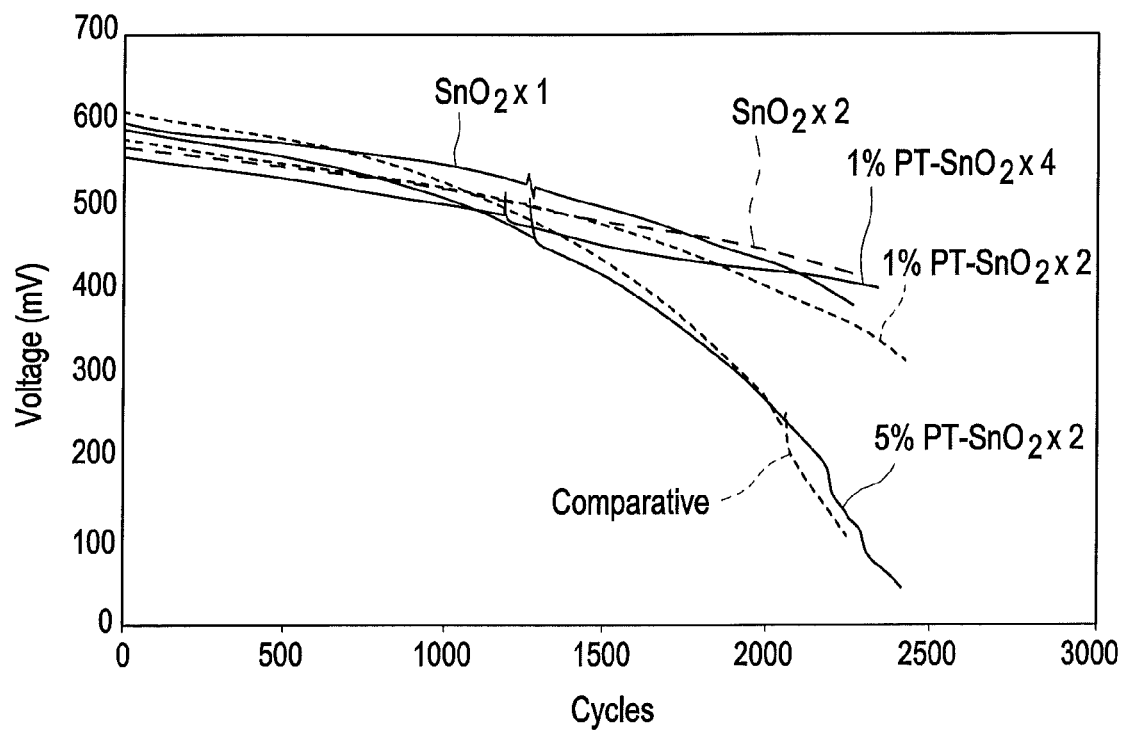
FIG. 4 compares plots of voltage versus number of startup/shutdown cycles of several inventive fuel cells in the Examples to that of a comparative fuel cell.

FIG. 4 compares plots of output voltage at 1.5 A/cm² versus number of startup/shutdown cycles for all the cells tested here. All the cells showed a slow degradation in voltage with cycle number. However, after about 1200 startup/shutdown cycles, the output voltage of the comparative cell and the cell with the 5 weight-% Pt—$SnO_2 \times 2$ anode GDL started to drop dramatically when compared to that of the other test cells. After 2000 cycles, the former were unable to provide almost any output voltage. The other test cells employing selectively conducting anode GDLs were still able to sustain a substantial voltage output.

Polarization results for the various tested cells are summarized in Table 2 below. In this table, representative voltages before cycle testing are provided at a low current density (0.1 A/cm²) and at a high current density (1.5 A/cm²). Representative voltages at these current densities are also provided after 1667 startup/shutdown cycles. Also, Table 2 shows the average degradation rate observed after 1667 cycles for each cell (i.e. difference in voltage before and after cycling divided by the number of cycles). As is evident from this data, the presence of the selectively conducting layer in the test cells results in a modest reduction in output voltage before cycle testing is done. However, without an appropriate selectively conducting layer present, the output voltage is drastically reduced after cycling.

TABLE 2

| Anode GDL used | Voltage in mV at 0.1 A/cm² before cycle testing | Voltage in mV at 1.5 A/cm² before cycle testing | Voltage in mV at 0.1 A/cm² after 1667 cycles | Voltage in mV at 1.5 A/cm² after 1667 cycles | Average degradation rate (mV/cycle) after 1667 cycles |
|---|---|---|---|---|---|
| Comparative | 851-860 | 624 | 740 | 100 | 125.5 |
| $SnO_2 \times 1$ | 856 | 609 | 773 | 434 | 67.4 |
| $SnO_2 \times 2$ | 851 | 577 | 793 | 472 | 69 |
| 1% Pt—$SnO_2 \times 2$ | 856 | 596 | 750 | 276 | 70.5 |
| 1% Pt—$SnO_2 \times 4$ | 852 | 534 | 808 | 437 | 71.4 |

(% means weight-%)

In the above table, voltage values relative to those of the comparative cell are provided in brackets for ease of comparison.

Figure 5:
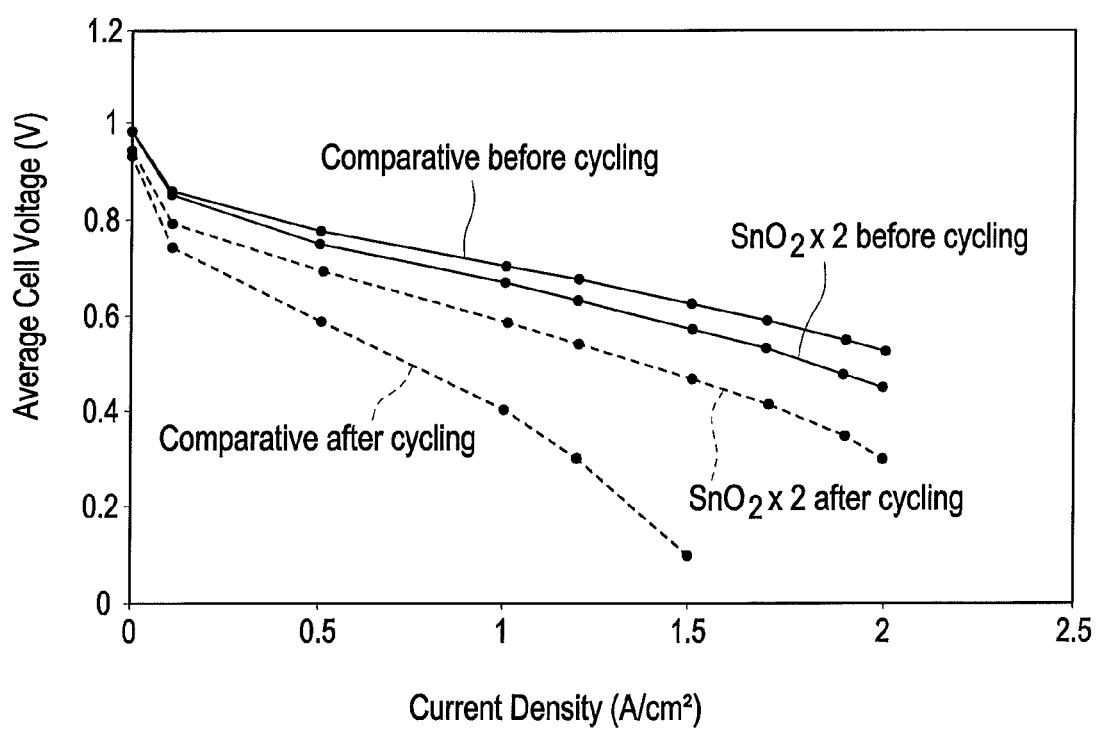
FIG. 5 compares plots of voltage versus current density, both before and after subjecting to numerous startup/shutdown cycles, of an exemplary inventive fuel cell in the Examples to that of a comparative fuel cell.

FIG. 5 shows exemplary polarization plots obtained for an inventive fuel cell (i.e. the cell made with the $SnO_2 \times 2$ anode GDL) and the comparative fuel cell. Shown are plots of voltage versus current density, both before cycle testing began and after the cycle testing shown in FIG. 4 had finished.

After cycle testing, the cells were disassembled for post-mortem analysis. Sections of each cell were obtained from near the fuel inlet, at the middle and near the outlet, were then mounted in epoxy, and analyzed using a scanning electron microscope. Measurements were made of the relative amount of platinum found in the membrane electrolyte, the thickness of the carbon GDL, and the thickness of the selectively conducting layer remaining (where appropriate), and these were compared to the values observed in the freshly assembled cells.

The presence of Pt in the membrane is indicative of loss of cathode catalyst. The comparative cell showed little Pt in the inlet region but significant amounts in the middle and outlet regions. The membranes of all of the cells comprising selectively conducting layers showed less Pt than that of the comparative cell. In some cases, such as for the cells made with the silica-$SnO_2$ and the 5 weight-% Pt—$SnO_2$×4 anode GDLs, the difference was appreciable.

A reduction in thickness of the cathode catalyst would be indicative of carbon corrosion. No appreciable thinning was seen in any cell tested.

A reduction in thickness of the selectively conducting layer is indicative of loss which could be due to washing out of the applied layer. However, no significant changes were observed in these values after cycling.

From observations of the 1 weight-% Pt—$SnO_2$×2 anode GDL as made and after post-mortem analysis, it was believed to suffer from relatively poor coating and/or layer adhesion. This may explain the poorer than expected results associated with its use when compared to the other test cells. With regards to the 5 weight-% Pt—$SnO_2$×2 anode GDL, it is postulated that the 5 weight-% amount deposited in this particular embodiment may be too much.

Generally however, these examples show a marked improvement in degradation after extended startup/shutdown cycling for actual fuel cells comprising selectively conducting anode GDLs. No significant adverse effect on fuel cell performance was observed with the presence of the selectively conducting layer in these example cells.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. A method for starting up a fuel cell system to supply power to a primary load, the system comprising a programmable controller for controlling a startup sequence of the system and a series stack of solid polymer electrolyte fuel cells, the fuel cells comprising a solid polymer electrolyte, a cathode, and an anode, the anode comprising anode components connected in series electrically, wherein the anode components comprise a selectively conducting component comprising a selectively conducting material, and the electrical resistance of the selectively conducting component in the presence of hydrogen is more than 100 times lower than the electrical resistance in the presence of air, the method comprising:

controlling the fuel cell system according to the startup sequence; and not purging the anode with hydrogen during the startup sequence.

2. The method of claim 1 comprising not supplying power from the fuel cell stack to an auxiliary load during the startup sequence.

3. A method for shutting down a fuel cell system to supply power to a primary load, the system comprising a programmable controller for controlling a shutdown sequence of the system and a series stack of solid polymer electrolyte fuel cells, the fuel cells comprising a solid polymer electrolyte, a cathode, and an anode, the anode comprising anode components connected in series electrically, wherein the anode components comprise a selectively conducting component comprising a selectively conducting material, and the electrical resistance of the selectively conducting component in the presence of hydrogen is more than 100 times lower than the electrical resistance in the presence of air, the method comprising:

controlling the fuel cell stack according to the shutdown sequence; and not purging the anode with air during the shutdown sequence.

4. The method of claim 3 comprising not supplying power from the fuel cell stack to an auxiliary load during the shutdown sequence.

5. The method of claim 3 comprising not purging the cathode with air during the shut-down sequence.

6. The method of claim 3 wherein the fuel cell system will be subjected to greater than 1000 startup and shutdown sequences over the lifetime of the system.

7. The method of claim 6 wherein the fuel cell system is mounted on board a vehicle and is the traction power supply for the vehicle and the primary load is the drive system for the vehicle.

8. The method of claim 3 wherein the electrical resistance of the selectively conducting component in the presence of hydrogen is more than 1000 times lower than the electrical resistance in the presence of air.

9. A fuel cell system comprising a programmable controller for controlling a startup sequence of the system and a series stack of solid polymer electrolyte fuel cells, the fuel cells comprising a solid polymer electrolyte, a cathode, and an anode, the anode comprising anode components connected in series electrically, wherein the anode components comprise a selectively conducting component comprising a selectively conducting material, and the electrical resistance of the selectively conducting component in the presence of hydrogen is more than 100 times lower than the electrical resistance in the presence of air, wherein the controller is configured to control the fuel cell system according to the startup method comprising:

controlling the fuel cell system according to the startup sequence; and not purging the anode with hydrogen during the startup sequence.

10. The fuel cell system of claim 9 wherein the system is absent an auxiliary load.

11. A fuel cell system comprising a programmable controller for controlling a shutdown sequence of the system and a series stack of solid polymer electrolyte fuel cells, the fuel cells comprising a solid polymer electrolyte, a cathode, and an anode, the anode comprising anode components connected in series electrically, wherein the anode components comprise a selectively conducting component comprising a selectively conducting material, and the electrical resistance of the selectively conducting component in the presence of hydrogen is more than 100 times lower than the electrical resistance in the presence of air, wherein the controller is configured to control/operate the fuel cell system according to the shutdown method comprising:

controlling the fuel cell stack according to the shutdown sequence; and not purging the anode with air during the shutdown sequence.

12. The fuel cell system of claim 11 wherein the system is absent apparatus for providing an anode air purge.

13. The fuel cell system of claim 11 wherein the system is absent an auxiliary load.

14. A fuel cell system comprising a programmable controller for controlling a startup sequence and a shutdown sequence of the system and a series stack of solid polymer electrolyte fuel cells, the fuel cells comprising a solid polymer electrolyte, a cathode, and an anode, the anode comprising anode components connected in series electrically, wherein the anode components comprise a selectively conducting component comprising a selectively conducting material, and the electrical resistance of the selectively conducting component in the presence of hydrogen is more than 100 times lower than the electrical resistance in the presence of air, wherein the controller is configured:

i) to control the fuel cell system according to the startup sequence, and not to purge the anode with hydrogen during the startup sequence; and ii) to control the fuel cell stack according to the shut-down sequence, and not to purge the anode with air during the shutdown sequence.

15. The fuel cell system of claim 14 wherein the fuel cell system is mounted on board a vehicle and is the traction power supply for the vehicle and the primary load is the drive system for the vehicle.

16. The method of claim 1 wherein the fuel cell system will be subjected to greater than 1000 startup and shutdown sequences over the lifetime of the system.

17. The method of claim 16 wherein the fuel cell system is mounted on board a vehicle and is the traction power supply for the vehicle and the primary load is the drive system for the vehicle.

18. The method of claim 1 wherein the electrical resistance of the selectively conducting component in the presence of hydrogen is more than 1000 times lower than the electrical resistance in the presence of air.

19. The fuel cell system of claim 9 wherein the fuel cell system is mounted on board a vehicle and is the traction power supply for the vehicle and the primary load is the drive system for the vehicle.

20. The fuel cell system of claim 11 wherein the fuel cell system is mounted on board a vehicle and is the traction power supply for the vehicle and the primary load is the drive system for the vehicle.

* * * * *